Jan. 30, 1968     H. H. FERRELL ET AL     3,366,175

SECONDARY RECOVERY PROCESS IN A GAS CAP RESERVOIR

Filed Oct. 1, 1965

INVENTORS
HOWARD H. FERRELL
MARTIN FELSENTHAL
CLAUDE L. JACOCKS

Gerald L. Floyd
ATTORNEY 3,366,175
SECONDARY RECOVERY PROCESS IN A
GAS CAP RESERVOIR
Howard H. Ferrell, Martin Felsenthal, and Claude L. Jacocks, Ponca City, Okla., assignors to Continental Oil Company, Ponca City, Okla., a corporation of Delaware
Filed Oct. 1, 1965, Ser. No. 491,979
11 Claims. (Cl. 166—9)

ABSTRACT OF THE DISCLOSURE

A secondary recovery process for gas cap reservoirs wherein the invasion of the gas zone by oil or secondary recovery fluid is decreased comprising:

Figure 1:
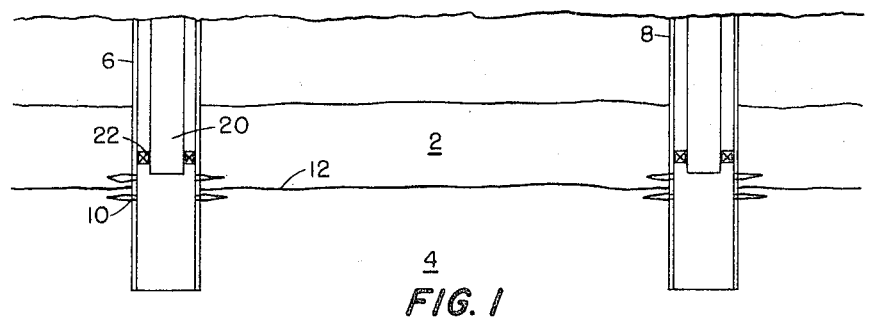

(a) injecting at the gas/oil interface a foaming agent,
(b) creating a gas-in-water foam by expanding the gas cap, and
(c) carrying out secondary recovery operations.

---

This invention relates to a secondary oil recovery process in gas capped reservoirs. More particularly, this invention relates to a process for recovery of additional oil from an underground gas cap reservoir by secondary recovery means wherein the invasion of the gas zone by oil or secondary recovery fluid is decreased.

Following the completion of one or more wells piercing a subterranean reservoir, oil is normally recovered through these wells first by utilization of natural reservoir energy which may exist in several forms including gas and water drives. The methods of oil recovery which employ natural reservoir energy generally are referred to as primary recovery. After primary recovery becomes uneconomical or the natural reservoir energy becomes substantially depleted, a substantial amount of oil remains in the reservoir. At this time, it is common practice to employ secondary recovery methods utilizing energy supplied from an external source to remove additional oil. The secondary recovery methods most widely used to date are those in which a fluid is introduced into the reservoir through one or more injection wells in order to displace the oil toward one or more production wells from which it may be recovered. Fluids which have been employed in this manner include water, brine, air, natural gas, carbon dioxide, petroleum gases and the like.

In oil reservoirs which have differences in structural elevation, gas accumulations frequently occur up-structure,, i.e., in the upper portion of the structure. This gas has a higher flow capacity than the liquids present in the reservoir. Thus, when a secondary recovery or driving fluid is injected into the formation via an injection well in an attempt to sweep oil toward a production well, some of the oil or some of the driving fluid, or both, may be forced up into the gas zone rather than being moved toward the production or recovery well. In the case of oil, this represents lost oil that will not be recovered in the process. In the case of the driving fluid, this means that efficiency is lost due to a portion of the driving fluid being dissipated into the gas zone rather than doing work displacing oil.

Accordingly, it is an object of this invention to increase the recovery of oil from a gas cap reservoir by secondary recovery means. It is another object to minimize encroachment of oil or flooding media into the gas zone of a gas cap reservoir during secondary recovery operations. It is a further object to provide a plugging material at or near the gas-oil interface of a gas cap reservoir. It is a still further object to utilize formation energy in creating said plugging material. Other objects, advantages and features of this invention will be apparent from the following description, drawings and appended claims.

The objects of this invention are attained by a process wherein a foaming agent, either alone or in aqueous solution, is injected into the formation at a point at or near the gas/oil interface of a gas cap reservoir, a foam is created along this interface and secondary recovery operations are carried out. The last two steps may be carried out either sequentially or at the same time. In one modification of the invention where the foam is created before the secondary recovery operation is started, the gas cap is expanded such as by producing a well down structure or injecting gas into the gas cap. The gas cap expands downwardly, contacts the foaming agent and forms a gas-in-water dispersion or foam bank at the gas/oil interface. Subsequently, secondary recovery operations are carried out in the oil zone such as by injecting a gas or liquid driving fluid therein. The driving fluid will tend to displace the oil through the formation toward a producing well. The foam bank will offer a highly resistant barrier to flow and decrease the tendency for either the driving fluid or displaced oil to encroach up into the relatively permeable gas zone. In an alternate embodiment the foam is created at the same time as the secondary recovery step by injecting the foaming agent or aqueous solution thereof as above and then injecting the secondary recovery driving fluid into the oil zone. The increased pressure in the oil zone will cause the oil, driving fluid or both to move up against the foaming agent and force the same up into the gas zone. When this occurs, the foaming agent mixes with the gas in the gas zone and with the gaseous driving fluid if such is used to create a foam bank which will resist further movement into the gas zone.

Creation of a foam bank in wells in connection with secondary recovery operations is known in the art. However, previously the foam has been used as a driving fluid and has been created either before injection into the well or in situ by sequential injection of a foaming agent and a gas. The gas chases the foaming agent and foams the portion thereof with which it catches up. Continued injection of gas moves the foam bank through the formation to displace oil. It has now been found that a foam bank may be created and used in a different manner than before. Foam banks formed in situ as described above are of relatively small volume and uncontrollable shape due to limitations of area over which the foaming agent and injected gas contact each other. In contrast, the inventors have found a method of creating a foam bank of large volume and of a shape which is desired for their new purpose, i.e., a flat planar mass of limited thickness but covering a wide area. Such a foam bank, if properly positioned, can be used not to displace formation fluids but as a barrier to prevent fluids on one side thereof from passing through the barrier to move into areas on the other side thereof offering reduced resistance to flow.

Any foaming agent may be used which will create a foam when formation brine or injected water containing such foaming agent contacts and mixes with formation or injected gas under reservoir conditions. Illustrative of suitable foaming agents are various water-soluble surface-active agents, such as:

(A) Nonionic:
    (I) Products obtained by autocondensation of various fatty matter and their derivatives with ethylene oxide, propylene oxide, glycols, or glycerols:
        (a) a fatty acid plus ethylene oxide or glycerol, such as palmitic acid plus 5 moles ethylene oxide or glycerol monostearate;
        (b) an alcohol plus ethylene oxide, such as hydroabietyl alcohol plus 15 moles ethylene oxide;
(c) an ester of aldehyde plus ethylene oxide
(d) an amide or amine plus ethylene oxide, such as diethanolamine plus 15 moles ethylene oxide.
(II) Products obtained by condensation of phenolic compounds having lateral chains with ethylene or propylene oxide. Examples are disecbutyl phenol plus 10 moles ethylene oxide and octyl phenol plus 12 moles ethylene oxide.
(3) Cationic:
(I) Neutralization product of primary, secondary, or tertiary amine with an acid such as trimethyl octyl ammonium chloride, lauryl dimethyl benzyl ammonium chloride and the like, commonly referred to as quaternary ammonium chlorides.
(C) Anionic:
(I) Alkyl aryl sulfonates such as ammonium isopropyl benzene sulfonate;
(II) Fatty alcohol sulfates such as sodium 2-methyl-7-ethyl-4-hendecyl sulfate;
(III) Sulfated and sulfonated amides and amines such as sodium N-methyl-N-oleyl taurate;
(IV) Sulfated and sulfonated esters and ethers such as dioctyl sodium sulfo succinate;
(V) Alkyl sulfonates such as sodium dodecyl sulfonate.
(D) Ampholytic:
(I) Molecules where the molecules as a whole forms a witterion, such as cetylaminoacetic acid.
a szitterion, such as cetylaminoacetic acid.

A reference book which describes many types of surfactants suitable as foaming agents in "Surface Active Agents and Detergents," volumes I and II, by Schwartz et al., Interscience Publishers.

Especially suitable foaming agents are compounds of the formula $$RNH_m—(A—COOX)_n$$

in which R is an aliphatic hydrocarbon group having 8 to 22 carbon atoms, A is a divalent hydrocarbon radical having 1 to 6 carbon atoms, X is a member selected from the group consisting of hydrogen, alkali metal and amine, $n$ is an integer of 1 to 2, and $m$ is an integer of 0 to 1 and the sum of $m$ and $n$ is 2.

Another excellent foaming agent is composed of 50 percent by weight ammonium salt of sulfated ethoxylated n-decanol containing about 40 percent ethylene oxide based on the alcohol, 15 percent isopropanol and 35 percent water as described in copending U.S. Ser. No. 313,789, hereinafter referred to as Foaming Agent A. Still another preferred foaming agent is the condensation product of octyl phenol with 10 mole ethylene oxide.

As stated previously, the foaming agent may be injected into the formation alone, with the water constituent of the foam coming from connate water or other water present in the formation. However, it is generally preferred to employ an aqueous solution of the foaming agent which is of lower viscosity and hence easier to inject than the concentrated foaming agent. Also such a solution is more economical to use and gives adequate foaming. The concentration of the foaming agent in water may be as low as 0.5 percent by weight. Generally, more than about 5.0 percent foaming agent is of little advantage, although more concentrated solutions are not harmful. Fresh water may be used, but it is generally preferred to use a brine, such as brine previously removed from the formation being treated or a synthetic brine, in order to decrease formation damage.

The method of this invention may be better understood by reference to FIGURES 1 through 4 which illustrate schematically by means of vertical sections of a gas cap reservoir one embodiment of the present invention at the various stages of the operation.

FIGURE 1 shows a typical gas cap reservoir having gas cap 2 and oil zone 4 penetrated by wells 6 and 8. Either or both of wells 6 and 8 have perforations 10 at the gas/oil interface 12.

Figure 2:
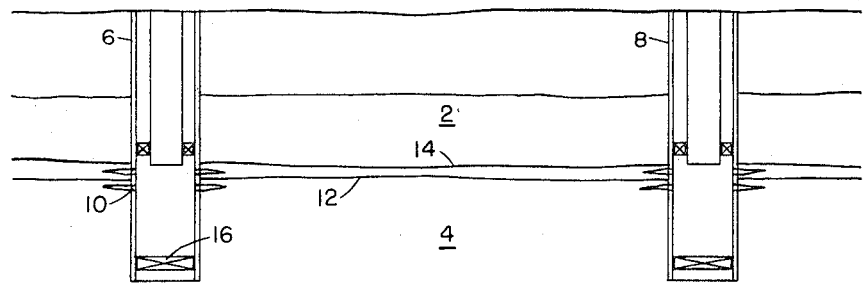

FIGURE 2 pictures the reservoir after foaming agent solution 14 has been injected at gas/oil interface 12 to form a blanket between gas cap 2 and oil zone 4. This step can be carried out by setting bridge plug 16 below perforations 10 to isolate oil zone 4 and then pumping foaming agent solution 14 through perforations 10 of well 6 or well 8, or both, until foaming agent solution 14 substantially covers gas/oil interface 12. Alternatively, foaming agent solution 14 may be injected into well 6 and well 8 produced to help move foaming agent solution 14 along gas/oil interface 12 toward well 8.

Figure 3:
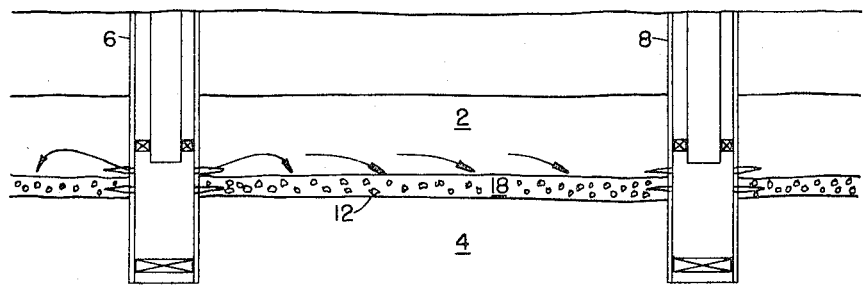

FIGURE 3 shows the reservoir during formation of foam bank 18 created by causing gas cap 2 to expand downwardly into foaming agent solution 14. This expansion can be caused by various methods such as injecting gas into gas cap 2 to create a pressure differential between gas cap 2 and oil zone 4 resulting in gas moving downwardly. Another procedure (not shown) is to block off perforations 10, remove bridge plug 16 and produce oil zone 4 of well 6, well 8, or both, to cause a pressure differential as above resulting in downward movement of gas or to inject a driving fluid into well 6, well 8, or both to cause a pressure differential resulting in the movement of fluids from the oil zone up into the gas zone. At any rate, it is evident that a horizontally disposed flat planar uniform pancake-shaped foam bank 18 can be created which extends along gas/oil interface 12 at all points where a pressure differential between the gas and oil phase causes the movement of fluids. It is not possible to create a foam bank of these characteristics by directing injection of less mobile foam formed outside the well or of a foaming agent followed by gas through the same entry point into the formation.

Figure 4:
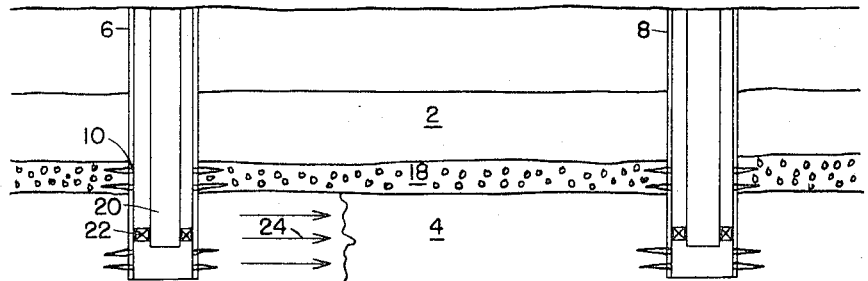

FIGURE 4 shows the subsequent partially completed secondary recovery operation. After perforations 10 have been sealed off or isolated as by dropping the well tubing 20 and packer 22 therebelow and removing bridge plug 16, driving fluid 24 is injected through well 6 into oil zone 4 to drive oil toward well 8. Low mobility foam bank 18 effectively prevents either driving fluid 24 or the oil being displaced toward well 8 from invading gas cap 2. Thus, the efficiency of the secondary recovery operation is greatly improved.

The size of the various slugs of fluids used in this invention vary widely depending on the reservoir characteristics, and area covered by the gas/oil interface. Sufficient foaming agent must be introduced to create a foam of sufficient thickness to withstand a pressure differential of 50 to 200 p.s.i., generally about 100 p.s.i., without appreciable movement. Approximately 0.05 pound foaming agent per cubic foot of rock is generally sufficient. In order to move sufficient gas into the foaming agent to create the foam, it is necessary that sufficient gas be injected into the gas cap or sufficient fluids produced from or injected into the underlying oil or water zones to create a pressure differential between the two zones of at least 20 p.s.i., and preferably no higher than 200 p.s.i.

*Examples 1 through 4*

A transparent plastic cylinder 2 inches in diameter and 18 inches long was packed with graded wet sand. Effective permeability was determined by flowing a 5 percent sodium chloride brine through the resulting synthetic core. The column was reduced to irreducible water saturation by flowing oil therethrough and the permeability to oil at irreducible water saturation determined using an oil injection pressure of 10 p.s.i. with the other end of the column open to atmospheric pressure. The direction of flow through the column was then reversed and a volume (0.1 to 0.05 hydrocarbon bore volumes) of foaming agent solution comprising 1 percent by volume Foaming Agent A in 5 percent sodium chloride brine injected followed by an injection of air for 5 minutes to move the foaming agent solution into the column. The direction of flow was again reversed to assume the original direction, air injected at a pressure of 10 p.s.i. for 1.5 hours to create a foam bank, the thickness of the foam bank measured, the permeability to oil again determined as above, and the percent reduction in oil flow rate calculated. In all tests, it was noted that the oil flow rate did not change during the 1.5-hour test period indicating the plugging action of the foam was of prolonged duration. The sharp reduction of oil flow rate in each test indicates the effectiveness of a foam bank in keeping a driving fluid, air in this instance, from entering a zone of relatively high permeability under a substantial pressure differential.

|  | Example | | | |
|---|---|---|---|---|
|  | 1 | 2 | 3 | 4 |
| Sand (mesh size) | 40-60 | 40-60 | 40-60 | 70 |
| Pore volume (cc.) | 226 | 224 | 226 | 166 |
| Oil | (¹) | (¹) | (²) | (²) |
| Oil viscosity (cps.) | 23 | 23 | 1.5 | 1.5 |
| Effective permeability (darcys) | 39.3 | 35.4 | 40.0 | 9.2 |
| Irreducible water saturation (percent pore space) | 21.2 | 20.7 | 21.0 | 3.6 |
| Oil flow rate at irreducible water saturation (cc./sec.) | 0.33 | 0.36 | 2.20 | 0.14 |
| Volume foaming agent solution (cc.) | 20 | 10 | 20 | 15 |
| Thickness of foam bank (inches) | 5 | 4 | 5 | 3.5 |
| Final oil flow rate (cc./sec.) | $0.55 \times 10^{-2}$ | $7 \times 10^{-2}$ | $2.7 \times 10^{-2}$ | $0.13 \times 10^{-2}$ |
| Percent reduction in oil flow rate | 98.3 | 81.6 | 98.8 | 99.1 |

¹ No. 80 pale.
² Kerosene.

It is apparent that many modifications and variations of the invention hereinbefore set forth may be made without departing from the spirit and scope thereof. The examples given are by way of illustration only, and the invention is limited only by the terms of the appended claims.

We claim:
1. A secondary recovery process for use in a gas cap reservoir comprising the sequential consecutive steps of:
    (a) injecting a foaming agent into the reservoir at a point near the gas/oil interface,
    (b) injecting a driving fluid into the oil zone to create a pressure differential in the reservoir whereby the pressure in the oil zone is greater than the pressure in the gas zone, thus causing the foaming agent to mix with the gas and form a foam, said driving fluid being injected prior to opening a production well.
2. The method of claim 1 wherein the foaming agent is employed as an aqueous solution.
3. A method of forming horizontally disposed flat planar pancake-shaped gas-in-water dispersions in a gas cap oil reservoir comprising sequentially:
    (a) injecting a foaming agent into the reservoir at a point near the gas/oil interface,
    (b) ceasing injection of said foaming agent,
    (c) producing oil from the oil zone thereby expanding the gas cap and causing mixing of the gas into admixture with the foaming agent to form a gas-in-water dispersion prior to injection of a secondary recovery driving fluid, and
    (d) injecting a secondary recovery driving fluid.
4. In an oil recovery process wherein a driving fluid is injected into a subterranean oil-bearing gas cap reservoir through an injection well to displace oil toward a production well, the improvement which comprises, preceding said injecting of driving fluid, sequentially injecting into the injection well and hence into the reservoir at the point near the gas/oil interface a foaming agent, ceasing the injection of the foaming agent, expanding the gas cap to create a band of foam in the reservoir near the gas/oil interface by producing fluids down structure through a well completed in a liquid-producing zone selected from the class consisting of an oil zone and a water zone, and thereafter injecting a driving fluid into the oil-bearing zone while producing a production well.
5. A secondary recovery process for use in a gas cap reservoir comprising the consecutive sequential steps of:
    (a) injecting a foaming agent into the reservoir at a point near the gas/oil interface,
    (b) creating a pressure differential in the reservoir whereby the pressure in the gap cap is greater than the pressure in the oil zone, said pressure differential being created by producing fluids down structure through a well completed in a liquid-producing zone selected from the class consisting of an oil zone and a water zone, causing the gas cap to expand and move into admixture with the foaming agent to form a foam bank and
    (c) thereafter injecting a driving fluid into the oil zone to displace oil therefrom.
6. A method of forming horizontally disposed flat planar pancake-shaped gas-in-water dispersion in a gas cap oil reservoir comprising sequentially:
    (a) injecting a foaming agent into the reservoir at a point near the gas/oil interface, and
    (b) mixing the gas into admixture with the foaming agent by injecting into the oil zone a secondary recovery fluid prior to opening a production well.
7. In an oil recovery process wherein a driving fluid is injected into a subterranean oil-bearing gas cap reservoir through an injection well to displace oil toward a production well, the improvement which comprises, preceding said injecting of driving fluid, injecting into the injection well and hence into the reservoir at a point near the gas/oil interface an aqueous solution of a foaming agent, ceasing injection of the foaming agent, expanding the gas cap causing mixing of the gas into admixture with the foaming agent to create a band of foam in the reservoir near the gas/oil interface and thereafter injecting a driving fluid into the oil-bearing zone.
8. A secondary recovery process for use in a gas cap reservoir comprising the consecutive steps of:
    (a) injecting an aqueous solution of a foaming agent into the reservoir at a point near the gas/oil interface,
    (b) creating a pressure differential in the reservoir whereby the pressure in the gas cap is greater than the pressure in the oil zone causing mixing of the gas into admixture with the foaming agent to create a foam bank, and
    (c) thereafter injecting a driving fluid into the oil zone to displace oil therefrom.
9. A method of forming a horizontally disposed flat planar pancake-shaped gas-in-water dispersion in a gas cap oil reservoir comprising:

(a) injecting a foaming agent into the reservoir at a point near the gas/oil interface, and
(b) mixing the gas into admixture with the foaming agent by injecting gas into the gas cap.

10. In an oil recovery process wherein a driving fluid is injected into a subterranean oil-bearing gas-cap reservoir through an injection well to displace oil toward a production well, the improvement which comprises, preceding said injection of driving fluid, injecting into the injection well and hence into the reservoir at a point near the gas/oil interface a foaming agent, expanding the gas cap by injecting gas into the gas cap through a well completed in the structure to create a band of foam in the reservoir near the gas/oil interface and injecting a driving fluid into the oil-bearing zone.

11. A secondary recovery process for use in a gas cap reservoir comprising the consecutive steps of:

(a) injecting a foaming agent into the reservoir at a point near the gas/oil interface,
(b) creating a pressure differential in the reservoir by injecting gas into the gas cap through a well completed in the structure whereby the pressure in the gas cap is greater than the pressure in the oil zone, and
(c) injecting a driving fluid into the oil zone to displace oil therefrom.

References Cited

UNITED STATES PATENTS

| | | | |
|---|---|---|---|
| 3,177,939 | 4/1965 | Holm | 166—9 |
| 3,196,944 | 7/1965 | Bernard | 166—9 |

JAMES A. LEPPINK, *Primary Examiner.*